US006961574B1

(12) United States Patent
Stage et al.

(10) Patent No.: US 6,961,574 B1
(45) Date of Patent: Nov. 1, 2005

(54) RADIO HANDSET

(75) Inventors: Erling Stage, Valby (DK); Claus Pedersen, Albertslund (DK)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/936,431

(22) PCT Filed: Mar. 6, 2000

(86) PCT No.: PCT/EP00/01923

§ 371 (c)(1),
(2), (4) Date: Mar. 7, 2002

(87) PCT Pub. No.: WO00/57657

PCT Pub. Date: Sep. 28, 2000

(30) Foreign Application Priority Data

Mar. 18, 1999 (GB) .................................... 9906317

(51) Int. Cl.[7] .............................................. H04Q 7/20

(52) U.S. Cl. .................. 455/445; 455/557; 455/556.1; 455/41.2; 370/351; 370/352; 370/356; 709/220; 709/223; 709/224

(58) Field of Search ............................ 455/557, 552.1, 455/553.1, 41.2, 445, 556.1, 566; 370/352, 370/351, 356; 209/223, 224, 220; 340/825.21, 340/7.47

(56) References Cited

U.S. PATENT DOCUMENTS

| 5,974,085 | A | * | 10/1999 | Smith | 375/222 |
| 6,272,333 | B1 | * | 8/2001 | Smith | 455/418 |
| 6,311,058 | B1 | * | 10/2001 | Wecker et al. | 455/418 |

FOREIGN PATENT DOCUMENTS

| GB | 2327565 | 1/1999 |
| WO | 00/18149 | 3/2000 |

* cited by examiner

*Primary Examiner*—William Trost
*Assistant Examiner*—Danh C Le
(74) *Attorney, Agent, or Firm*—Antonelli, Terry, Stout and Kraus, LLP.

(57) ABSTRACT

A radio handset for browsing the Internet comprising a browser application, which allows a user of the handset to access the internet via a first transceiver means arranged to send radio packets to and receive radio packets from an Internet gateway. The radio handset comprising further routing means arranged to route content supplied by the internet gateway via the first transceiver means to a registered application, the content having an identifier for identifying the type of application suitable for receiving the content and arranged to register applications by associating an application on registration with at least one identifier. A user interface is connected to the browser means having a display for displaying content and user input means. Also, an interface having a radio transceiver for coupling with an interface of an accessory device comprising a remote application.

28 Claims, 4 Drawing Sheets

| ADDRESS | CONTENT TYPE |
|---|---|
| BROWSER | A, B, C |
| RINGTONES | R |
| E-MAIL | X |
| INTERFACE 34 | F |

RADIO HANDSET

BACKGROUND OF THE INVENTION

1. Field of the Invention

The present invention relates to a radio handset for browsing the Internet. It particularly relates to increasing the functionality of such a handset.

2. Description of the Prior Art

Mobile phones are becoming widely used as they provide security, mobility and flexibility. Recently the popularity of the Internet has increased among the general population. The Internet can be browsed using a so-called browser application, which provides an easily usable visual interface. It would be particularly desirable to combine the hand held nature of a mobile phone and its associated portability with the ability to browse the Internet. The wireless application protocol (WAP) has been developed with this purpose in mind. It allows a radio handset to communicate with a transceiver at an internet gateway and accesses the internet through a radio link.

A desktop computer or the like, has until now been the standard device for accessing the World Wide Web. The computer generally has a display, a cursor control and selecting device such as a mouse and a keyboard. When using a device to browse the World Wide Web, the device exchanges information with the Internet gateway. The device acts as a client and the Internet as a server. Typically content is downloaded from the internet to the device to allow a browser application in the device to display one page having a number of items or icons which are 'active'. Choosing and selecting an item or icon using the cursor control and selection device creates a 'link' to another defined page. The browser application requests this page from the Internet acting as server. Information downloaded from the Internet to the device allows the browser application to display the page, which has been linked. The browser application mediates between the user and the Internet. It sends requests to the Internet and receives content therefrom.

The content received from the Internet may be instructions allowing the browser application to recreate a page with the correct links. It may, however, be content which cannot be processed by the browser application but which requires a separate different application such as a viewer, an audio application, etc. Typically these separate applications are not integrated with the browser but are separate. A small device such as a radio handset can only register a limited number of such applications at any one time. The browser application routes received instructions to the appropriate application if registered.

SUMMARY OF THE INVENTION

It would be desirable to increase the number of applications to which a user of a radio handset with browser application has access.

According to one aspect of the present invention there is provided a radio handset for browsing the Internet comprising: a browser application which allows a user of the handset to access the internet via a first transceiver means arranged to send radio packets to and receive radio packets from an Internet gateway; routing means arranged to route content supplied by the internet gateway via the first transceiver means to a registered application, the content having an identifier for identifying the type of application suitable for receiving the content and arranged to register applications by associating an application on registration with at least one identifier; a user interface connected to the browser application having a display for displaying content and user input means; and an interface having a radio transceiver for coupling with an interface of an accessory device comprising a remote application, the interface being arranged to receive content routed to the remote application and to thereby increase the functionality of the handset, wherein the remote application is automatically registered by the routing means in response to the coupling of the handset and accessory device.

According to another aspect of the present invention there is provided a system comprising a radio handset for browsing the internet and downloading content therefrom and an accessory device for increasing the functionality of the radio handset in response to said content, the handset comprising: a browser application which allows a user of the handset to access the internet via first transceiver means arranged to send radio packets to and receive radio packets from an internet gateway; routing means arranged to route content supplied by the internet gateway via the first transceiver means to a registered application, the content having an identifier for identifying the type of application suitable for receiving the content and arranged to register applications by associating an application on registration with at least one identifier; a user interface connected to the browser application having a screen for displaying content and user input means; an interface having a radio transceiver for coupling with an interface of an accessory device having a remote application, the interface being arranged to receive content routed to the remote application and to thereby increase the functionality of the handset, wherein the remote application is automatically registered by the routing means in response to the coupling of the handset and accessory device.

The handset, by coupling with an accessory device, increases the range of content which can be downloaded from the internet for use by the handset. The coupling increases the range of Internet related functions to which a user of the handset has access.

The handset is hand portable. The handset may consequently have a limited input interface which makes it difficult to input complex instructions for example to manually register applications. The automatic registration of applications provided by embodiments of the invention overcome such difficulties.

According to embodiments of the invention the handset couples to an accessory device having one or more remote applications therein. According to other embodiments of the invention the handset couples with more than one accessory device, where each accessory device has at least one remote application therein. Each of the remote applications can thus be accessed by a user of the handset through the handset.

For a better understanding of the present invention and to understand how the same may be brought into effect reference will now be made by way of example only to the accompanying drawings in which:

DETAILED DESCRIPTION OF THE INVENTION

Figure 1:
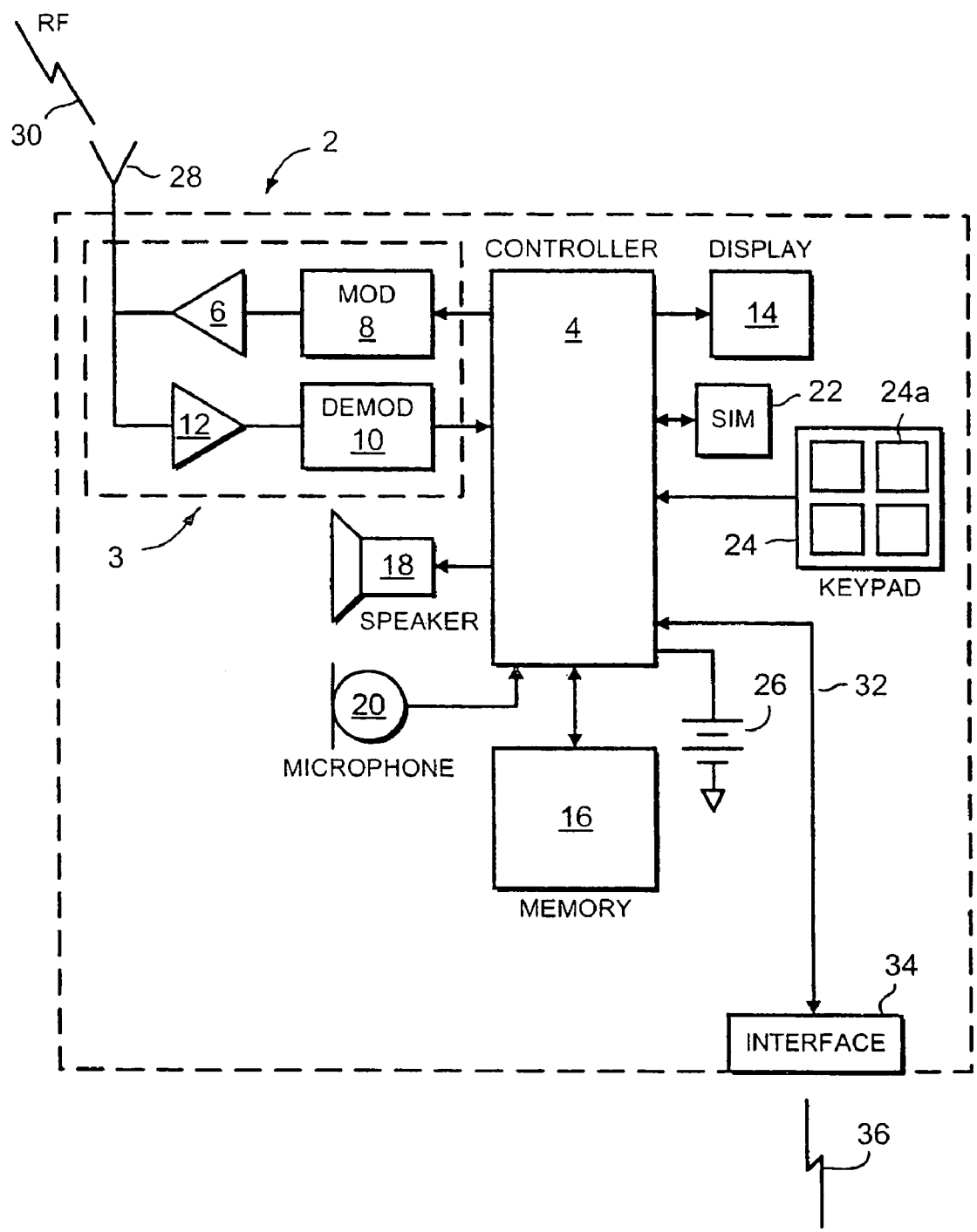
FIGS. 1 and 2 illustrate a radio handset and accessory device.
Figure 1:
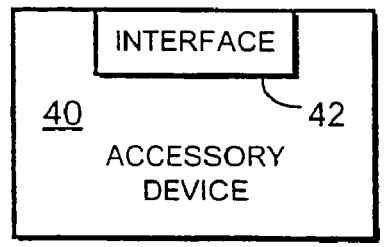
Figure 2:
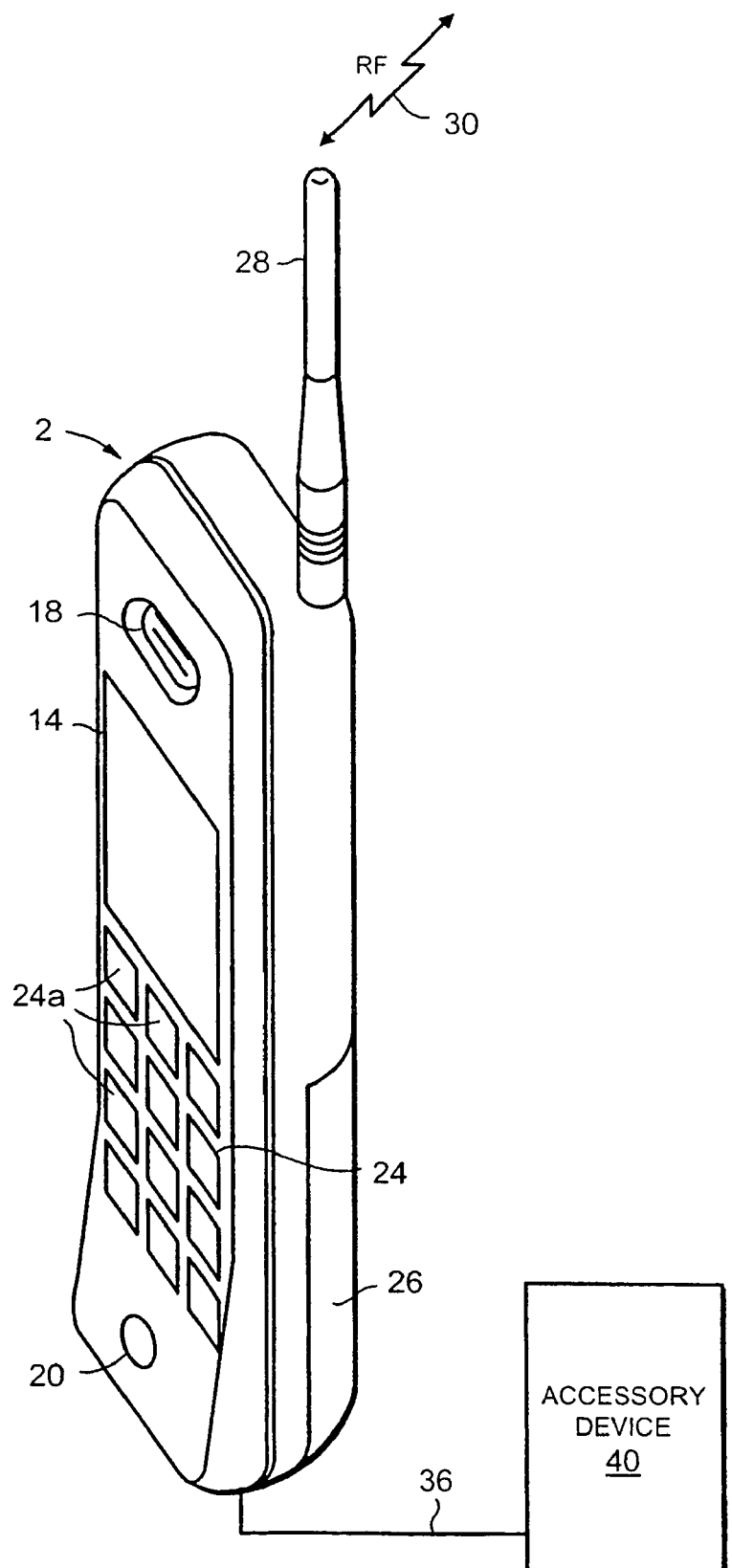

FIGS. 1 and 2 illustrate a hand-portable radio communications device, henceforth referred to as a terminal or radio handset 2. The terminal 2 is small enough to be carried by hand and is preferably sized to fit into a pocket of a jacket. The terminal communicates with other terminals or devices using radio waves.

The terminal 2 has a user interface comprising, for input, a keypad 24 having keys 24a and a microphone 20 and, for output, a speaker 18 and a display 14. The size of keypad 24 and display 14 are necessarily limited by the size of the terminal 2. The terminal 2 is controlled by controller 4 and is powered by battery 26. The controller 4 receives signals from the microphone 20 and the keypad 24 and provides signals to the display 14 and the speaker 18. The terminal 2 has an interface 34 and a transceiver 3, which are used to communicate outside the terminal 2. The interface 34 is connected to the controller via bus 32. The interface may include a transceiver for radio or infra red communication and/or a port for direct electrical connection. The transceiver 3 is a radio frequency transceiver connected to an antenna 28 and controller 4. It is arranged to communicate via a radio frequency interface 30. The transceiver 3 includes a modulator 8 for modulating signals received from the controller 4 and a transmitter 6, which presents the modulated signals to the antenna 28. The transceiver 3 also includes a receiver 12 which processes signals received at the antenna 28 and provides them to a demodulator 10 which provides demodulated signals to the controller 4. The terminal 2 has a RAM memory 16 which is connected to the controller 4 via a bus. The terminal also has a SIM memory 22 connected to the controller 4 which provides information allowing the terminal 2 to function as a mobile phone. When functioning as a mobile phone, the terminal 2 transmits and receives radio frequency signals via the antenna 28.

The terminal 2 is connected to an interface 42 of an accessory device 40 via the interface 34. The connection 36 between the interface 34 and interface 42 may be achieved in a number of ways. For example radio waves could be used. One suitable radio communication protocol is the wireless applications protocol (WAP) described in "WAP Architecture Version 30 Apr. 1998". This requires the interface 34 to comprise a WAP stack and a radio transceiver and the interface 42 to likewise comprise a WAP stack and radio transceiver. Another suitable protocol is the Bluetooth protocol described in co-pending UK Patent Application No 9820859.8, the contents of which are hereby incorporated by reference, which requires the interface 34 and interface 42 to include low power RF transceivers.

Although a single accessory device 40 is shown in FIGS. 1 and 2, the terminal 2 could make simultaneous connection with a plurality of such accessory devices. Although the transceiver 4/antenna 28 and the interface 34 are shown separately, they may be integrated.

The fundamental functions of the terminal 2 are provided by the combination of the controller 4 and the memory 16. The accessory device 40 may be accessed by the controller 4 via the bus 32 and interface 34 and thus enhance the functionality of the terminal 2.

The terminal 2 has a number of fundamental capabilities including system capabilities relating to its radio communication abilities (whether it involves the WAP, Bluetooth, GSM, AMPS or other communication protocols) and other capabilities which allow the terminal to provide the features of a database, a personal organizer, a word processor or a web browser. The fundamental capabilities are integrated together in a coherent way to provide the terminal's features.

Figures 3, 5:
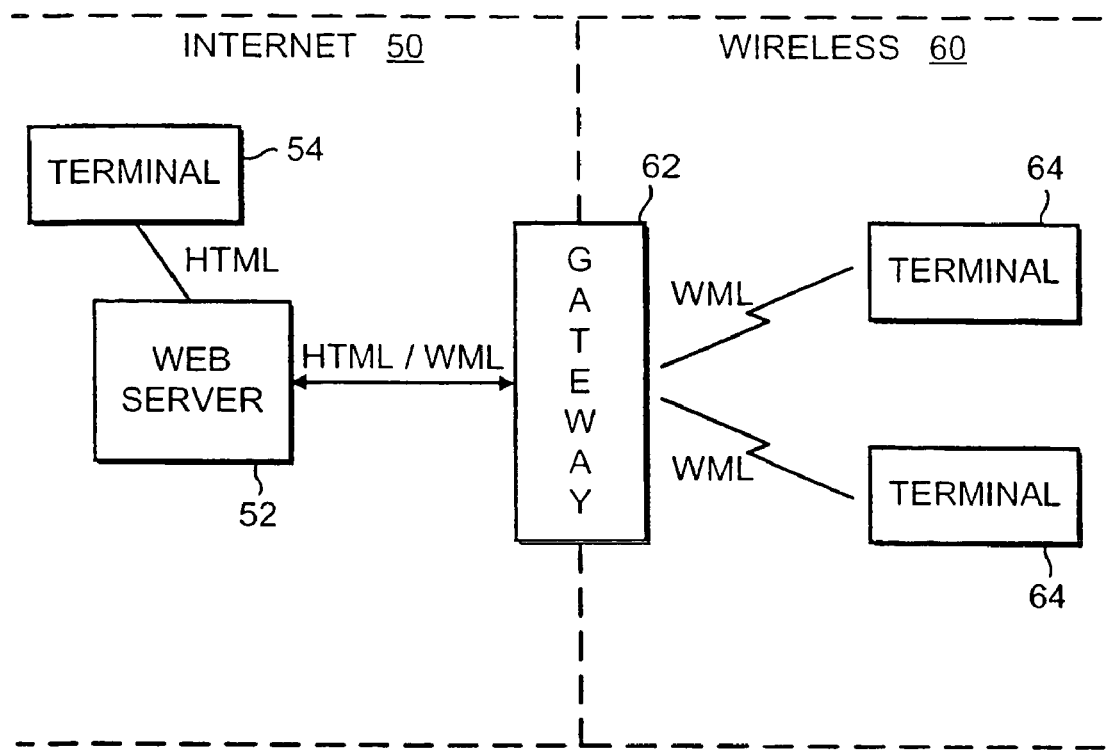
FIG. 3 illustrates a network for accessing the Internet.
FIG. 5 illustrates a routing table.

FIG. 3 illustrates an Internet network 50 and a wireless network 60. The Internet network comprises a web server 52 and a plurality of Internet stations 54, which are clients to the web server 52. The Internet network uses World Wide Web (WWW) protocols. The wireless network 60 includes a plurality of wireless terminals 64, each of which can access the web server 52 via a protocol gateway 62. These terminals are preferably hand-portable radio handsets 2. Communication between a wireless terminal 64 and the protocol gateway 62 is according to the Wireless Application Protocol (WAP). WAP specifies an application framework and network protocols for wireless terminals such as mobile telephones, pagers and personal digital assistants. WAP brings Internet content and advanced data services to wireless terminals. WAP can work across differing wireless network technologies and bearer types (GSM, CDMA, SMS). Communication between the web server 52 and protocol gateway 62 is according to WWW protocols.

The wireless terminal differs from the Internet station in that generally it has a less powerful CPU, less memory, restricted power consumption, smaller displays and more limited input devices. The wireless network differs from the Internet network in that generally it has less bandwidth, more latency, less connection stability and less predictable availability. The WAP architecture is optimized for narrow bandwidth bearers with potentially high latency and is optimized for efficient use of device resources.

Each device in a network is capable of sending and receiving packets of information. A device may according to context be a server or a client, and while a server may service a number of clients while being a client to another server. Devices include the web server 52, the Internet stations 54, the wireless terminals 64 and the protocol gateway 62. A wireless terminal 64 acts as client and initiates a request for a connection with an origin server, the web server 52, to access a resource. The resource, identified by a URL (Uniform Resource Locator), is data (content) stored or generated at an origin server 52. The content is typically displayed or interpreted by the client. The protocol gateway translates requests from the WAP protocol stack used by the wireless terminal 64 to the WWW (World Wide Web) protocol stack used by the web server. The web server either returns WAP content such as WML (Wireless Markup Language) or WWW content such as HTML (HyperText Markup Language). In the later case a filter is used to translate the WWW content to WAP content e.g. HTML to WML. The protocol gateway also encodes content sent over the wireless network to the wireless terminal and decodes data sent to it by the wireless terminal.

WAP defines a set of standard protocols that enable communication between mobile terminals and network servers. WAP uses a standard naming model according to which standard Internet URLs are used to identify content on origin servers. It also uses content typing. All WAP content is given a specific type consistent with WWW typing which allows a wireless terminal to correctly process the content based on type. WAP also uses standard content formats and standard communication protocols.

A Wireless Application Environment which forms a upper layer of the WAP stack includes a microbrowser. The browser uses wireless markup language (WML) and a lightweight markup language, WMLScript a lightweight scripting language.

Figure 4:
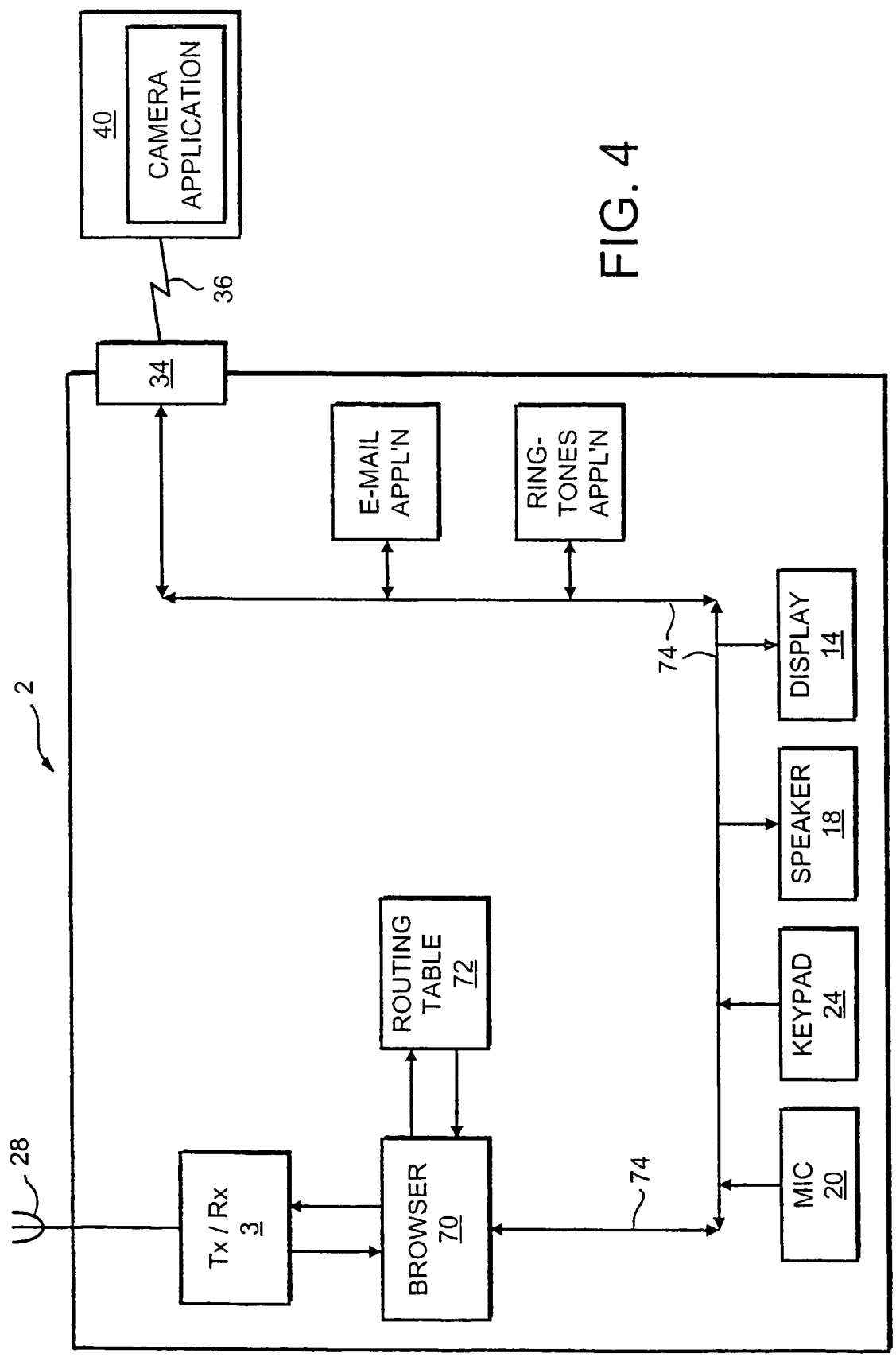
FIG. 4 illustrates a radio handset having a browser.

FIG. 4 is a schematic diagram of a terminal 2, which is communicating with a protocol gateway 62 and thence with a web server 52. The Figure illustrates the antenna 28, transceiver 3, display 14, speaker 18, keyboard 24, microphone 20 and interface 34 previously illustrated in FIG. 2. The Figure additionally illustrates browser application 70 and its routing table 72, ringtone application 76, email application 78 and bus 74. The applications are typically separate tasks of the controller 4. The accessory device 40 illustratively comprises a camera application.

The antenna 28 which communicates with the protocol gateway 62 is in bi-directional communication with the transceiver 3, which in turn is in bi-directional communication with the browser 70. The browser is in bi-directional communication with its routing table 72 and the bus 74. The bus 74 provides inputs to the output devices (the speaker 18 and display 14) and receives inputs from the input devices (the microphone 20 and keyboard 24). The bus is also in communication with the interface 34 and the applications 76 and 78.

Typically a user controls the browser 70 through the input devices 20 and 24. A desired resource is identified using a URL. The browser controls the transceiver 3 to request access to the resource. The terminal 2 thus communicates with the protocol gateway 62 which in turn communicates with the web server 52. The WAP content returned to the transceiver 3 in response to the request is supplied to the browser 70. The final destination of the received content will however depend upon the content type of the received content. The content type is an indicator which is dependent upon the type of application for which it is intended. For example a browser application may be able to use, display or interpret a variety of content types but be unable to use a variety of other different content types. Likewise the email application 78 and the ringtone application 76 will be designed to receive content of a specific types. The routing table 72 registers applications which are usable by the terminal. On registering an application, the routing table associates with the address of the application, the content type or types that the application can process. A typical routing table 72 is illustrated in FIG. 5.

The browser application 70 identifies the content type of the received content and accesses the routing table 72. The routing table returns the address of the registered application associated with the received content type and the browser transfers the received content to that address. If there is no registered application associated with the received content type, a null address is returned to the browser which sends an error message to the display 14.

In this way the terminal 2 has the browser functionality and in addition the functionality of additional applications.

Whereas the applications 76 and 78 are integrated within the terminal 2, the application associated with the accessory device, in this case a camera application is not integrated within the terminal 2 but is remote. The accessory device may be replaced to change and/or enhance the functionality of the terminal, or it may be removed.

It is necessary to keep the routing table 72 up to date. Consequently when a new device is coupled to the interface 34, the application or applications in the device must be registered by making entries in the routing table and when a device is removed from communication with the interface 34, the application or applications in the device must be de-registered by deleting entries in the routing table.

In a preferred embodiment, the interface 34 has its own address and the routing table 72 associates this address with the content type for the application (or applications) in the accessory device to which the interface 34 communicates. When an accessory device first couples with the interface 34, it provides the content type for its application(s) to the interface. The interface in turn supplies this data to the routing table, where it is stored in association with the interface's address. Thus the application(s) in the accessory device are registered. When the accessory device is removed and de-couples from the interface, the interface supplies this information to the routing table where the content type entry (entries) associated with the interface address is (are) deleted. Thus the application(s) in the accessory device are de-registered.

One method of detecting the coupling or de-coupling of an accessory device with the interface is to poll the interface 34 at regular intervals to detect if there is a device communicating therewith and to identify such a device. Another method of detecting the presence or removal of a device is for the accessory device to announce to the terminal the start and end of the period during which it communicates with the terminal (i.e. announces coupling and de-coupling respectively).

Although the architecture in FIG. 4 has been illustrated by means of a bus, it would be possible to use other architectures such as that described in UK Patent Application 9903262.5.

The system illustrated in FIG. 4 therefore allows an application in an accessory device to register and de-register automatically with the browser. There is no manual registration, although the option to register an application may be given by displaying a choice on the display 14 and allowing user to accept or decline registration by selection of one of the choices using the keypad 24 or other input device. The browser can then automatically route received content to the appropriate application without the need to perform manual registrations as is currently required in Microsoft Windows 95 (Trademark). Thus laborious manual input through the small keypad 24 is not needed and the functionality of the terminal 2 with browser 70 is increased.

The present invention may include any novel feature or combination of features disclosed herein either explicitly or implicitly or any generalization thereof irrespective of whether or not it relates to the presently claimed invention or mitigates any or all of the problems addressed. In view of the foregoing description it will be evident to a person skilled in the art that various modifications may be made within the scope of the invention.

What is claimed is:

1. A radio handset for browsing the Internet comprising:
   a browser application which provides a user of the handset access to the Internet via a first transceiver which sends radio packets to and receives radio packets from an Internet gateway;
   a router arranged to route content supplied by the Internet gateway via the first transceiver to a registered application, the content having an identifier which identifies the type of application suitable for receiving the content and arranged to register applications by associating an application on registration with at least one identifier;
   a user interface connected to the browser application having a display for displaying content and a user input; and
   an interface having a radio transceiver for coupling with an interface of an accessory device comprising a remote application, the interface being arranged to receive content routed to the remote application and to thereby increase the functionality of the handset, wherein the remote application is automatically registered by the router in response to the coupling of the handset and accessory device.

2. A handset as claimed in claim 1 wherein transmission from and to the transceiver is in accordance with the WAP protocol.

3. A handset as claimed in claim 1 wherein the first transceiver and the radio transceiver are separate.

4. A handset as claimed in claim 1 wherein the radio transceiver communicates with the accessory device using low power radio frequency signals.

5. A handset as claimed in claim 4 wherein the radio transceiver transmits and receives signals according to the Bluetooth standard.

6. A handset as claimed in claim 1 wherein the router and the browser application are integrated.

7. A handset as claimed in claim 1 wherein a processor including a memory which executes the browser application.

8. A handset as claimed in claim 1 wherein the router comprises a look-up table associating application addresses with an identifier or identifiers.

9. A handset as claimed in claim 8 wherein registration of an application comprises entry OT the application's address and an associated identifier or identifiers in the routing table.

10. A handset as claimed in claim 1 wherein the identifier for the content comprises the content type.

11. A handset as claimed in claim 1 wherein the router de-registers applications by disassociating the application with an associated at least one identifier.

12. A handset as claimed in claim 11 wherein de-registration occurs in response to removal of an application from the handset and/or in response to de-coupling of the handset and accessory device.

13. A handset as claimed in claim 1 wherein the browser application is a registered application.

14. A system comprising a radio handset for browsing the Internet and downloading content therefrom and an accessory device for increasing functionality of the radio handset in response to the content, the handset comprising:

a browser application which provides a user of the handset access to the Internet via a first transceiver which sends radio packets to and receives radio packets from an Internet gateway;

a router arranged to route content supplied by the Internet gateway via the first transceiver to a registered application, the content having an identifier for identifying the type of application suitable for receiving the content and arranged to register applications by associating an application on registration with at least one identifier;

a user interface connected to the browser application having a screen for displaying content and a user input; and an interface having a radio transceiver for coupling with an interface of an accessory device having a remote application, the interface receiving content routed to the remote application and to thereby increase the functionality of the handset; and wherein the remote application is automatically registered by the router in response to the coupling of the handset and accessory device.

15. A radio handset for browsing the Internet comprising:

a browser application which allows a user of the handset to access the Internet via a first transceiver means arranged to send radio packets to and receive radio packets from an Internet gateway;

routing means arranged to route content supplied by the internet gateway via the first transceiver means to a registered application, the content having an identifier for identifying the type of application suitable for receiving the content and arranged to register applications by associating an application on registration with at least one identifier;

a user interface connected to the browser application having a display for displaying content and user input means; and an interface having a radio transceiver for coupling with an interface of an accessory device comprising a remote application, the interface being arranged to receive content routed to the remote application and to thereby increase the functionality of the handset, wherein the remote application is automatically registered by the routing means in response to the coupling of the handset and accessory device.

16. A handset as claimed in claim 15 wherein transmission from and to the transceiver is in accordance with the WAP protocol.

17. A handset as claimed in claim 15 wherein the first transceiver means and the radio transceiver are separate.

18. A handset as claimed in claim 15 wherein the radio transceiver is arranged to communicate with the accessory device using low power radio frequency signals.

19. A handset as claimed in claim 18 wherein the radio transceiver transmits and receives signals according to the Bluetooth standard.

20. A handset as claimed in claim 15 wherein the routing means and the browser application are integrated.

21. A handset as claimed in claim 15 wherein a processor means including memory performs the functions of the browser application.

22. A handset as claimed in claim 15 wherein the routing means comprises a look-up table associating application addresses with an identifier or identifiers.

23. A handset as claimed in claim 22 wherein registration of an application comprises entry of the application's address and its associated identifier or identifiers in the routing table.

24. A handset as claimed in claim 15 wherein the identifier for the content comprises the content type.

25. A handset as claimed in claim 15 wherein the routing means is arranged to de-register registered applications by disassociating the application with its associated at least one identifier.

26. A handset as claimed in claim 25 wherein de-registration occurs in response to removal of an application from the handset and/or in response to the de-coupling of the handset and accessory device.

27. A handset as claimed in claim 15 wherein the browser application is a registered application.

28. A system comprising a radio handset for browsing the Internet and downloading content therefrom and an accessory device for increasing the functionality of the radio handset in response to said content, the handset comprising:

a browser application which allows a user of the handset to access the Internet via first transceiver means arranged to send radio packets to and receive radio packets from an Internet gateway;

routing means arranged to route content supplied by the Internet gateway via the first transceiver means to a registered application, the content having an identifier for identifying the type of application suitable for receiving the content and arranged to register applications by associating an application on registration with at least one identifier;

a user interface connected to the browser application having a screen for displaying content and user input means;

an interface having a radio transceiver for coupling with an interface of an accessory device having a remote application, the interface being arranged to receive content routed to the remote application and to thereby increase the functionality of the handset, and wherein the remote application is automatically registered by the routing means in response to the coupling of the handset and accessory device.

* * * * *